Figure 1:

J. N. BRIGGS.
BALE-TIE.

No. 177,683.  Patented May 23, 1876.

Witnesses.  Inventor
H. Rennie  John N. Briggs
Joseph Caffrell  Coeymans, Albany Co., N.Y.

UNITED STATES PATENT OFFICE.

JOHN N. BRIGGS, OF COEYMANS, NEW YORK.

IMPROVEMENT IN BALE-TIES.

Specification forming part of Letters Patent No. 177,683, dated May 23, 1876; application filed April 17, 1876.

*To all whom it may concern:*

Be it known that I, JOHN N. BRIGGS, of Coeymans, in the county of Albany and State of New York, have invented a new and useful Bale-Tie, of which the following is a full and exact description:

My invention relates to the class of bale-ties that are made entirely of wire, and used for securing hay and other similar products in bales; and it consists in constructing the ties with an open hook at each end of the wire, bent substantially in the form shown in the drawing, and in such manner that, when the hooks are interlocked in the manner herein shown and described, the wire forming the hooks will be arranged in the form of a tied knot of the kind commonly known as a "square knot."

Figure 2:
Figure 3:
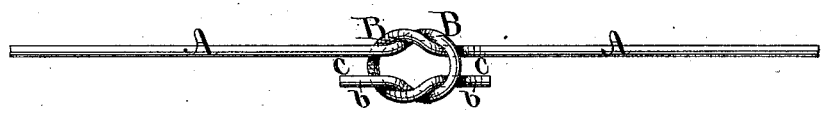
Figure 4:

In the accompanying drawing, making a part of this specification, Figure 1 is a plan view of the opposite ends of my tie separated, for the purpose of showing the form of the hooks; Fig. 2, an edge view of the hooks when loosely interlocked; Fig. 3, a plan view of the same, and Fig. 4 a plan view of the interlocked hooks after being drawn together by a strain upon tie.

As shown in the drawing, A represents the body of the tie, which I commonly make of a single piece of steel wire, of sufficient length to form the entire tie. At each end of it an open hook, B, is formed. Both of the hooks are bent so as to leave their short ends *b* projecting from the same side of the tie, as shown in Fig. 1. The hooks are made in the form of an open eye, with a contracted throat-opening, C, slightly narrower than the diameter of the eye, for the purpose of facilitating the insertion of the short ends *b* into the eyes of the opposite ends of the tie; and for the purpose of further facilitating the interlocking of the two ends of the tie, the hooks should also be bent in the form shown in Fig. 2—that is to say, the hook at one end of the tie should be given an upward inclination, and the hook at the other end an inclination in the reverse direction.

When the hooks are formed in the manner described the interlocking is effected by passing the hook at one end of the tie under and through the other hook, keeping the short end *b* on the upper side, and passing it through the throat C, after which the hook must be turned over the body of the opposite end, so as to carry the bight of the hook down under the body of the tie, and until the short ends of both hooks are lying at the same side of the tie, and the bights of both hooks are around the body of the tie. The hooks are then moved closely together, the short ends of each being passed through the eye of the opposite hook, when the parts assume the form of the square knot, as shown in Fig. 3. In this form the strain is thrown in a direct line upon the body of the tie, and the short end of each hook is so securely held by the eye of the opposite hook as to render their retention an absolute certainty.

By bending the hooks so as to stand upon opposite sides of the body of the tie, and interlocking them in a similar manner, a connection such as is commonly called a "granny knot" is formed, by which the strain is thrown upon the body of the tie in an indirect line, the variation from a direct line being equal to the diameter of the wire used. While my invention embraces this modification, I preferably construct the hooks so as to form the square-knot fastening, as being the best and most reliable.

I claim as my invention—

The wire bale-tie A, constructed with an open hook, B, at each of its ends, for the purpose of interlocking the ends together, in the manner and for the purpose herein specified.

JOHN N. BRIGGS.

Witnesses:
H. RENNIE,
JOSEPH CAFFRELL.